United States Patent
Jagow et al.

(10) Patent No.: US 9,930,823 B2
(45) Date of Patent: Apr. 3, 2018

(54) REDUCING WHEEL FORCES ON A FIELD SURFACE

(71) Applicant: Bourgault Industries Ltd., St. Brieux (CA)

(72) Inventors: Scot Jagow, St. Brieux (CA); Robert Klenz, St. Brieux (CA); Aden Arguin, St. Brieux (CA)

(73) Assignee: Bourgault Industries Ltd., St. Brieux (CA)

( * ) Notice: Subject to any disclaimer, the term of this patent is extended or adjusted under 35 U.S.C. 154(b) by 546 days.

(21) Appl. No.: 14/549,725

(22) Filed: Nov. 21, 2014

(65) Prior Publication Data

US 2016/0143209 A1    May 26, 2016

(51) Int. Cl.
*A01B 63/14* (2006.01)

(52) U.S. Cl.
CPC .................................. *A01B 63/145* (2013.01)

(58) Field of Classification Search
CPC ..... A01B 63/145; A01B 63/11; A01B 63/111; A01B 63/114; A01B 63/1145; A01B 63/16; A01B 33/087; A01B 73/044; A01B 73/046
See application file for complete search history.

(56) References Cited

U.S. PATENT DOCUMENTS

| | | | | |
|---|---|---|---|---|
| 4,817,730 A | * | 4/1989 | Winter | A01B 63/145 172/328 |
| 4,903,781 A | * | 2/1990 | Smit | A01B 63/145 172/316 |
| 5,479,992 A | * | 1/1996 | Bassett | A01B 63/114 111/134 |
| 6,044,916 A | * | 4/2000 | Hundeby | A01O 5/062 172/448 |
| 8,261,845 B2 | * | 9/2012 | Palen | A01B 63/22 172/396 |
| 8,567,517 B2 | * | 10/2013 | Friggstad | A01B 63/32 172/140 |
| 9,200,644 B2 | * | 12/2015 | Barfels | F15B 1/024 |

(Continued)

FOREIGN PATENT DOCUMENTS

| | | | | |
|---|---|---|---|---|
| CA | 2772865 | | 9/2013 | |
| DE | 202011107536 U1 | * | 1/2012 | ........... A01B 49/027 |

(Continued)

*Primary Examiner* — Matthew D. Troutman
(74) *Attorney, Agent, or Firm* — Frost Brown Todd LLC (57) ABSTRACT

A system for reducing implement wheel forces on a field surface has an agricultural implement with a frame mounted on frame wheels and ground engaging tools mounted on the frame. When the ground engaging tools move down to penetrate the field surface they exert an upward tool force on the frame. Support arms are movably connected to the implement frame and a support wheel is rotatably mounted to each support arm. A support bias element exerts a support bias force on each support arm to force the support wheel against the field surface and to correspondingly force the implement frame upward, transferring a supported frame weight from the implement frame to the support wheels, such that an unsupported frame weight is carried on the frame wheels. A bias control varies the support bias forces to maintain the unsupported frame weight at a level greater than the upward tool force.

22 Claims, 4 Drawing Sheets

(56) References Cited

U.S. PATENT DOCUMENTS

| | | | |
|---|---|---|---|
| 9,661,798 B2* | 5/2017 | Sudbrink | A01B 63/22 |
| 2001/0045294 A1* | 11/2001 | Mayerle | A01B 63/32 |
| | | | 172/452 |
| 2010/0258325 A1* | 10/2010 | Palen | A01B 63/22 |
| | | | 172/423 |

FOREIGN PATENT DOCUMENTS

| | | | | |
|---|---|---|---|---|
| EP | 2 589 283 A1 | | 5/2013 | |
| EP | EP-2589283 A1 | * | 5/2013 | ........... A01B 49/027 |
| EP | EP-2591651 A1 | * | 5/2013 | ........... A01B 63/145 |

* cited by examiner

REDUCING WHEEL FORCES ON A FIELD SURFACE

This disclosure relates to the field of agricultural implements and in particular provides a system and method for reducing wheel forces exerted on agricultural field surfaces.

BACKGROUND

A typical towed agricultural implement has a frame supported on frame wheels with a hitch extending forward from the frame for connection to a tractor for towing in an operating travel direction, and a plurality of ground engaging tools mounted on the frame. The frame wheels support the frame in an orientation parallel to the soil surface such that each ground engaging tool penetrates the soil to the same depth. In order to allow larger modern agricultural implements to follow varying ground contours the implement frame will typically include a plurality of wing frames connected at horizontal pivot axes oriented parallel to the operating travel direction. The frame wheels must be located and configured to support each wing frame in an orientation horizontal to the surface of the soil under the wing frame. The frame wheels may be configured to move up and down with respect to the frame to adjust working depth, however during operation the frame wheels are fixed in a working position relative to the frame to maintain the frame in the desired orientation such that the depth of penetration of the ground engaging tools is maintained at the desired depth.

In order to perform a typical agricultural operation in a field, the ground engaging tools must be laterally spaced equally across the width of the implement such that the paths of the tools in the ground are equally spaced. For example in an air seeder, seed row spacing is selected to optimize crop yields, and the lateral spacing of the furrow openers must be equal to the desired row spacing across the entire width of the frame. Similarly in a cultivating implement the cultivator shovels must be evenly spaced to achieve proper cultivation. A typical implement frame will have three or four lateral frame members oriented perpendicular to the operating travel direction, with ground engaging tools spaced evenly along each lateral frame member.

Typical towed agricultural implements have either a floating hitch or a rigid hitch. In a rigid hitch implement, the hitch is rigidly connected to the frame and the frame wheels are located generally in a middle location with respect to the front and rear ends of the frame, and the frame is levelled by adjusting the vertical position of the front end of the hitch with respect to the tractor drawbar so that the frame is level as it is towed along a level field surface. Positioning the frame wheels in the middle of the frame with the requirement that the ground engaging tools be evenly spaced means that the space available for frame wheels is limited.

In a floating hitch implement the hitch is pivotally connected to the frame about a horizontal hitch pivot axis oriented perpendicular to the operating travel direction, and the frame wheels are located on the front and rear ends of the frame, and configured to support the frame in a level orientation as it is towed along a level field surface. In such a floating hitch implement the front wheels must be configured to pivot about a vertical axis in order to allow the implement to turn.

In both rigid hitch and floating hitch implements, it is desired to minimize the fore and aft distance from the front ground engaging tools to the rear ground engaging tools so that as undulating terrain varies under the frame, the variation of the depth of penetration of the ground engaging tools is minimized. Minimizing the distance from front to rear also facilitates maneuvering the implement.

Thus it is desirable to minimize the distance between the front and rear frame wheels on a floating hitch implement to maintain the desired orientation of the frame parallel to the soil thereunder. The requirement that the front wheels pivot about a vertical axis significantly increases the space required for placement of each front wheel. A typical front implement wheel assembly uses a caster wheel where the vertical pivot axis is located forward of the rotational axis of the wheel. The caster wheel must be allowed to pivot though 360 degrees to allow the implement to move in a reverse direction, and so considerable space must be provided between the caster wheels.

In hard soil conditions, typical ground engaging tools, such as disc type furrow openers of an air seeder, may require a considerable downward force applied thereto to force them to penetrate the ground. Such a downward force must be applied by the weight of the frame, either directly where the ground engaging tools are fixed to the frame, or by a hydraulic cylinder pushing downward against the tools, and in reaction also pushing upward against the frame. Thus the implement frame must have a weight sufficient to resist the upward force urging the implement frame and frame wheels upward off the ground, and where soils are hard there may be little weight carried on the frame wheels, as the downward force being exerted on the ground engaging tools and in reaction urging the frame upward reduces the weight of the frame that must be supported by the frame wheels.

Conversely in softer soils, little downward force may be required to cause the ground engaging tools to penetrate the soil with the result that most of the weight of the frame is carried on the frame wheels. Where the ground is very soft the frame wheels may sink into the soil surface, causing the ground engaging tools to penetrate deeper into the soil and thus adversely affecting the desired working depth and increasing the draft forces required to tow the implement, increasing fuel costs. In extreme cases the frame wheels may sink to such an extent that the implement becomes stuck. Even where the soil is not so soft as to cause the frame wheels to sink, the increased weight on the frame wheels can cause compaction of the soil and adversely affect the productivity of the soil.

Generally in implement design it is desirable to provide as much wheel support as possible by providing an increased number of wheels and/or larger wheels however other design considerations often limit the number and size of frame wheels. For example Canadian Patent Number 2,772,865 to Scherman describes the problems involved in providing large frame wheels to support the front end of an air seeder in soft ground.

SUMMARY OF THE INVENTION

The present disclosure provides a system and method for reducing wheel forces exerted on agricultural field surfaces that overcomes problems in the prior art.

The present disclosure provides auxiliary support wheels that are movably attached to the implement frame and biased against the soil, thereby spreading the weight of the frame over the support wheels and the frame wheels. As the terrain undulates, the support wheels move up and down with respect to the frame in response to changes in orientation of the frame with respect to the ground and so do not affect the orientation of the frame or the working depth of the ground engaging tools mounted to the frame. The bias force is selected to ensure that the frame is always supported on the ground surface by the frame wheels, and so the frame is at all times oriented as dictated by the frame wheels and not by the support wheels. Since the support wheels do not affect the orientation of the frame, they can be attached to the frame at any convenient location.

In a first embodiment the present disclosure provides a method of reducing implement wheel forces on an agricultural field surface. The method comprises providing an agricultural implement comprising an implement frame mounted on a plurality of frame wheels for travel in an operating travel direction and a plurality of ground engaging tools mounted on the implement frame, and wherein the frame wheels support the implement frame and ground engaging tools in a desired orientation with respect to the field surface; movably connecting a plurality of support arms to the implement frame and rotatably mounting a support wheel to a wheel end of each support arm; towing the agricultural implement along the field surface with the ground engaging tools penetrating the field surface to a desired working depth, wherein the ground engaging tools exert an upward tool force on the implement frame that is less than a downward force exerted by a frame weight of the implement frame; exerting a support bias force on each support arm to push the support wheel against the field surface and to correspondingly urge the implement frame upward with respect to the support wheel to transfer a supported frame weight from the implement frame to the support wheels, such that an unsupported frame weight is carried on the frame wheels; selecting the support bias forces such that the unsupported frame weight is greater than the upward tool force.

In a second embodiment the present disclosure provides a system for reducing implement wheel forces on an agricultural field surface. The system comprises an agricultural implement comprising an implement frame mounted on a plurality of frame wheels for travel in an operating travel direction and a plurality of ground engaging tools mounted on the implement frame, and wherein the frame wheels support the implement frame and ground engaging tools in a desired orientation with respect to the field surface. A tool control is operative to move the ground engaging tools down to penetrate the field surface to a desired working depth, and wherein when penetrating the field surface, the ground engaging tools exert an upward tool force on the implement frame. A plurality of support arms are movably connected to the implement frame and a support wheel is rotatably mounted to a wheel end of each support arm. A support bias element is operative to exert a support bias force on each support arm to push the corresponding support wheel against the field surface and to correspondingly urge the implement frame upward with respect to the support wheel to transfer a supported frame weight from the implement frame to the support wheels, such that an unsupported frame weight is carried on the frame wheels. A bias control is operative to vary the support bias forces, and the support bias forces are selected to maintain the unsupported frame weight at a level greater than the upward tool force.

The present disclosure provides a system and method for reducing wheel forces exerted on agricultural field surfaces, thereby reducing compaction and loss of soil productivity. In the present disclosure the weight of the implement frame is spread over an increased number of wheels, thus reducing the weight on each wheel. In addition to reducing compaction, in very soft field surfaces the tendency of the frame wheels to sink into soft ground is reduced.

The support wheels may be mounted on all sides of the implement to support all sides, or may be mounted only on locations where more support is desirable. The arms and wheels of the system can be located at convenient locations where interference with functionality of the implement is minimized. Since the support wheels do not dictate the orientation of the implement frame and ground engaging tools, many of the problems associated with positioning larger wheels or an increased number of wheels on an implement frame for increased support are avoided.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
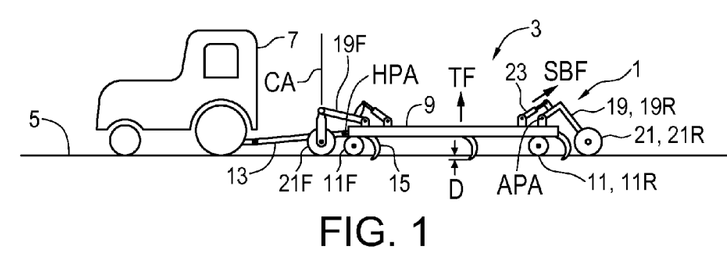
FIG. 1 is a schematic side view of an embodiment of system of the present disclosure for reducing implement wheel forces on an agricultural field surface.
Figure 2:
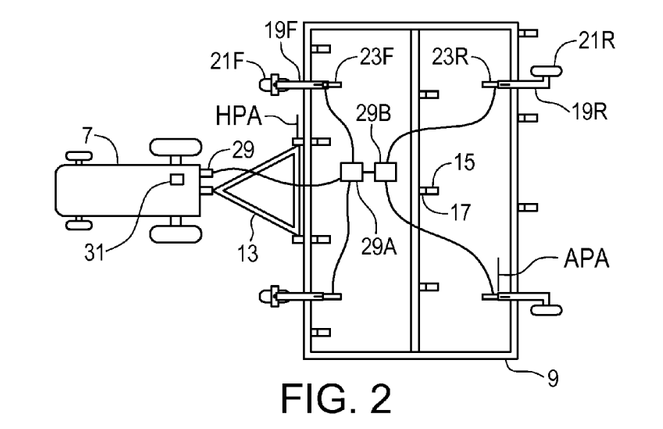
FIG. 2 is a schematic top view of the system of FIG. 1.

FIGS. 1 and 2 schematically illustrate an embodiment of a system 1 of the present disclosure for reducing implement wheel forces on an agricultural field surface. An agricultural implement 3 is connected to a tractor 7 for towing along the field surface 5 and the implement 3 comprises an implement frame 9 mounted on a plurality of frame wheels 11 for travel in an operating travel direction T along the field surface 5. The illustrated implement 3 is of the floating hitch type with front and rear frame wheels 11 and a hitch 13 pivotally attached to the implement frame 9 about a hitch pivot axis HPA. As is known in the art the front frame wheels 11F are caster wheels.

A plurality of ground engaging tools 15 are mounted on the implement frame 9, and the frame wheels 11 support the implement frame 9 and ground engaging tools 15 in a desired orientation with respect to the field surface 5, with the implement frame 9 substantially parallel to the field surface 5. A tool control is operative to move the ground engaging tools 15 down to penetrate the field surface 5 to a desired working depth D. In the illustrated implement 3 the tool control is provided by an actuator, such as a tool hydraulic cylinder 17 as described below, on each ground engaging tool 15 which moves the corresponding tool 15 up and down. The working depth is selected by adjusting a gauge wheel, packer wheel, or the like mounted on the tool 15. When penetrating the field surface 5, the ground engaging tools 15 exert an upward tool force TF on the implement frame 9.

A plurality of support arms 19 are movably connected to the implement frame 9 and a support wheel 21 is rotatably mounted to a wheel end of each support arm 19. In the illustrated system 1 the end of each support arm 19 opposite the wheel end thereof is pivotally connected to the implement frame 9 about a substantially horizontal arm pivot axis APA. The front support arms 19F extend forward from a front end of the implement frame 9 and a front support wheel 21F is pivotally mounted on the wheel end of each front support arm 19F about a vertical caster axis CA. The rear support arms 19R extend rearward from a rear end of the implement frame 9 and a rear support wheel 21F is mounted on the wheel end of each rear support arm 19R. It is contemplated that support arms could extend laterally from right and left sides of the implement frame 9 as well however same would need to be raised to a position above the implement frame 9 when working adjacent to obstacles.

Figure 3:
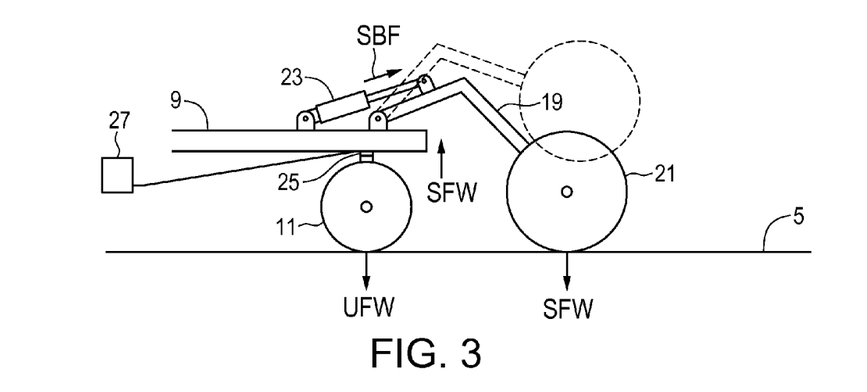
FIG. 3 is a schematic side view showing a portion of the agricultural implement frame of FIG. 1 supported on a frame wheel and a support wheel, and showing the forces exerted.

A support bias element, illustrated as a support hydraulic cylinder 23, is operative to exert a support bias force SBF on each support arm 19 to push the corresponding support wheel 21 against the field surface 5 and to correspondingly urge the implement frame 9 upward with respect to the support wheel 21 to transfer a supported frame weight SFW from the implement frame 9 to the support wheels 21, such that an unsupported frame weight UFW is carried on the frame wheels 11. FIG. 3 schematically illustrates the forces that are in place at one location on the agricultural implement 3.

Thus the system 1 of the present disclosure transfers a portion of the weight of the implement frame 9 from the frame wheels 11 to the support wheels 21 and reduces the implement wheel forces exerted on the field surface 5 by the frame wheels 11. The support bias forces SBF are selected to maintain the unsupported frame weight UFW at a level greater than the upward tool force TF. If the support bias forces SBF were at a level such that the unsupported frame weight UFW was less than the upward tool force TF the frame wheels 11 would be lifted off the field surface 5 and the desired orientation of the implement frame 9 and ground engaging tools 15 with respect to the field surface 5 could not be maintained.

For any given implement 3, the upward tool force TF varies depending on the working depth D, soil conditions, and like factors. For example in some types of agricultural implements when the working depth D increases, the upward tool force TF increases, such that the support bias forces SBF must be decreased to avoid lifting the frame wheels 11 above the field surface 5. Similarly in order to maintain a desired level of support when the desired working depth D decreases such that the upward tool force TF decreases, the support bias forces SBF must be increased.

Ideally it is desirable to select the support bias forces so that the downward force on each square inch of field surface was the same under each of the wheels 11, 21. The frame wheels 11 and support wheels 21 exert a downward wheel pressure on the field surface depending on a size of a corresponding frame wheel tire and support wheel tire, and ideally the support bias forces are selected such that the downward wheel pressure exerted by the frame wheels 11 is about equal to the downward wheel pressure exerted by the support wheels 21.

Where the frame wheels 11 and support wheels 21 are about the same size the support bias forces SBF would be selected such that the portion of supported frame weight SFW carried by each support wheel 21 is about equal to the portion of unsupported frame weight UFW carried by each frame wheel 11. Typically however, as seen in the illustrated system 1, the support wheels 21 are larger than the frame wheels 11 and so have a larger weight bearing footprint and the support bias forces SBF are selected such that the portion of supported frame weight SFW carried by each support wheel 21 is greater than the portion of unsupported frame weight UFW carried by each frame wheel 11.

The upward tool force that results from the engagement of the tools 15 in the ground is not the same at each location on the implement frame 9 and, similarly the so the unsupported frame weight UFW carried by each frame wheel 11 is not the same. For example in shank type tools that drag through the ground, draft forces required to pull the tool through the ground increase as working depth increases. In a floating hitch type implement such as schematically illustrated in FIGS. 1 and 2 with front and rear frame wheels 11F, 11R, the rear drag forces on the ground engaging tools 15 below the hitch pivot axis HPA create a moment about the hitch pivot axis HPA that can transfer weight from the rear end of the implement frame 9 to the front end of the implement frame 9, thereby reducing the frame weight carried by each rear frame wheel 11R and increasing the frame weight carried by each front frame wheel 11F.

In contrast disc type ground engaging tools 15 require considerable downward force to push them into the ground but roll through the ground and so create less drag forces. Thus in the implement described in FIG. 5 with disc type ground engaging tools 15 along the front of the implement frame increasing the working depth of the discs will urge the front of the frame 9 and the front frame wheels 11RF upward and transfer weight to the rear frame wheels 11R.

Similarly when the implement is an air seeder, hard soils also typically require increased packing forces so that where the ground engaging tools 15 are trailing arm furrow opener assemblies as described below, the downward force on the packer wheels is increased, thus increasing the upward tool force all along the implement frame 9.

Thus it can be seen that determining the degree, direction, and location of the forces acting on the implement frame 9 and the frame wheels 11 is quite complex. In practice the support bias forces SBF at different locations on the implement frame 9 will be selected based on experience of the effects on upward tool force TF of the various conditions such as working depth D, soil hardness, etc. on the particular implement in question. To ensure the upward tool force TF does not exceed the unsupported frame weight UFW, a force sensor 25, as schematically illustrated in FIG. 3, could be located to determine a portion of the unsupported frame weight UFW being carried by one of the frame wheels 11, and connected to a force indicator 27 to indicate same to an operator in the tractor. The operator can then reduce the support bias forces to a minimum or zero and the indicator 27 will show about the total frame weight carried on the frame wheel 11, and then increase the support bias force to achieve a suitable unsupported frame weight, based on tire size, location of the sensor, and like factors. Force sensors 25 could be located on a number of different frame wheels 11, since the frame weight carried by frame wheels at different locations will typically be different.

Figure 4:
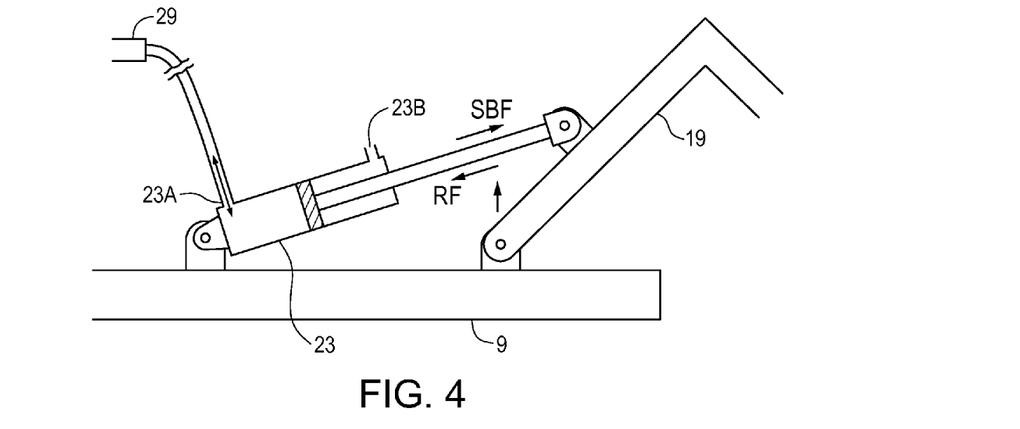
FIG. 4 is a schematic side sectional view of the support hydraulic cylinder of the system of FIG. 1.

The support bias elements are provided by support hydraulic cylinders 23, and each support hydraulic cylinder 23 is mounted at one end to the implement frame 9 and mounted at an opposite end thereof to the corresponding support arm 19. An active support hydraulic source 29, provided typically by the tractor 7, is operative to direct pressurized hydraulic fluid, as schematically illustrated in FIG. 4, into a first port 23A of each support hydraulic cylinder 23 and allow the hydraulic fluid to flow into and out of the first port 23A to allow the support hydraulic cylinder 23 to extend and retract while exerting the support bias force SBF. A support bias control 31 is operative to vary a pressure of the hydraulic fluid to vary the support bias force SBF.

The illustrated active support hydraulic source 29 directs pressurized hydraulic fluid into the first port 23A of each support hydraulic cylinder 23 at substantially the same pressure. In some applications it may be desirable to have larger or smaller support bias forces at different locations on the implement frame 9 to ensure that each frame wheel 11 maintains contact with the ground at those locations where the frame wheel 11 supports a lesser frame weight, while also providing the desired frame support.

The support bias force SBF on any one of the support arms 19 can be varied by varying the pressure at the corresponding support hydraulic cylinder 23. For example FIG. 1 schematically illustrate the support hydraulic cylinders 23F that are connected to the support arms 19F along the front of the implement frame 9 are connected to receive hydraulic fluid from the support hydraulic source 29 through a first pressure control 29A, and the support hydraulic cylinders 23R that are connected to the support arms 19R along the rear of the implement frame 9 are connected to receive hydraulic fluid from the support hydraulic source 29 through a second pressure control 29B.

Varying the support bias force SBF on any one of the support arms 19 can also be accomplished by providing support hydraulic cylinders 23 that have different diameters and so will provide different support bias forces when the same pressure is supplied to each one.

Figure 9:
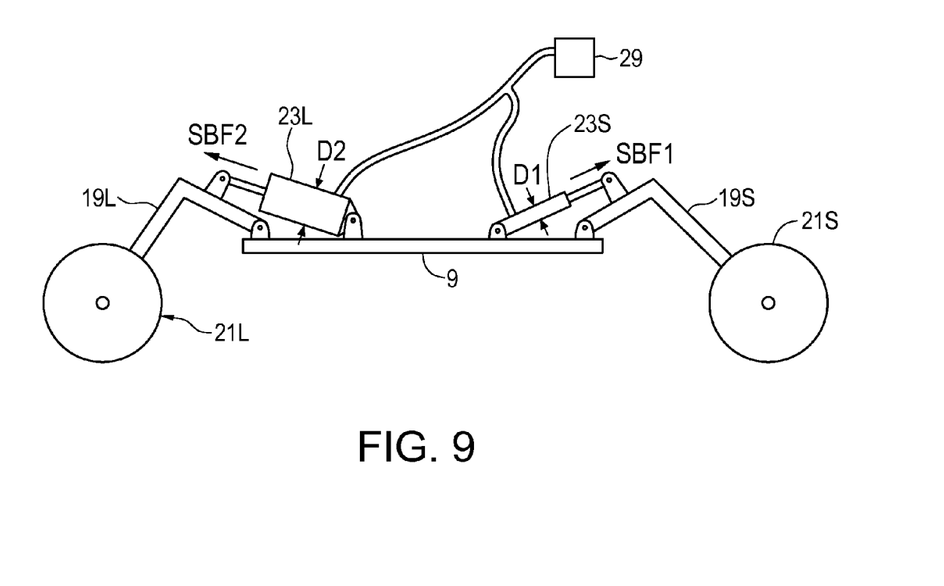
FIG. 9 is a schematic side view of the system of FIG. 1 where one support hydraulic cylinder is larger than the other.

FIG. 9 schematically illustrates an implement frame 9 with first and second support hydraulic cylinders 23S, 23L connected to the active hydraulic source 29. The first support hydraulic cylinder 23S has a first diameter D1 and exerts a first support bias force SBF1 on a first support arm 19S, and a second support hydraulic cylinder 23L has a second diameter D2 greater than the first diameter D1 and therefore exerts a second support bias force SBF2 on a second support arm 19L that is greater than the first support bias force SBF1.

Each support arm 19 can also be moved to a transport position, schematically indicated by phantom lines in FIG. 3, by directing pressurized hydraulic fluid into the second port 23B of the support hydraulic cylinder 23 to raise the support arm 19 and mounted support wheel 21 above the field surface. Depending on the configuration of the agricultural implement 3 when in a transport position, a suitable position for the support arm 19 and wheel 21 can be selected.

Figure 5:
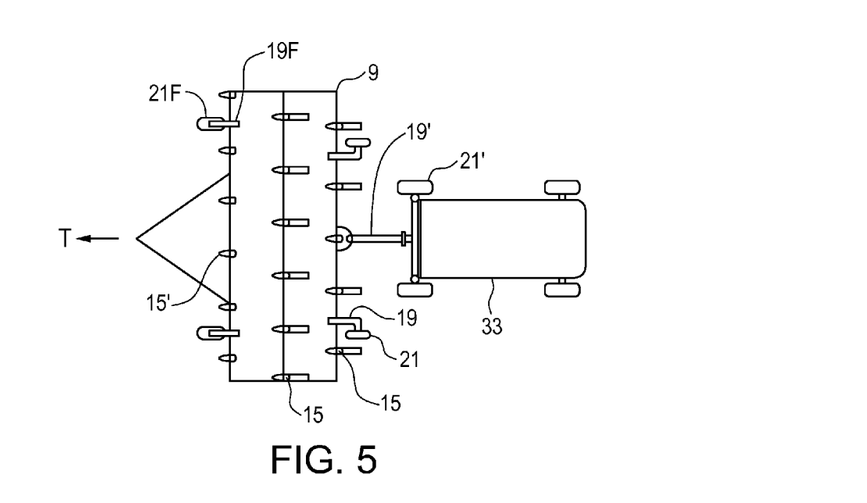
FIG. 5 is a schematic top view of the system of FIG. 1 with first and second ground engaging tools mounted on the implement frame, and a agricultural product cart towed behind the implement frame.
Figure 6:
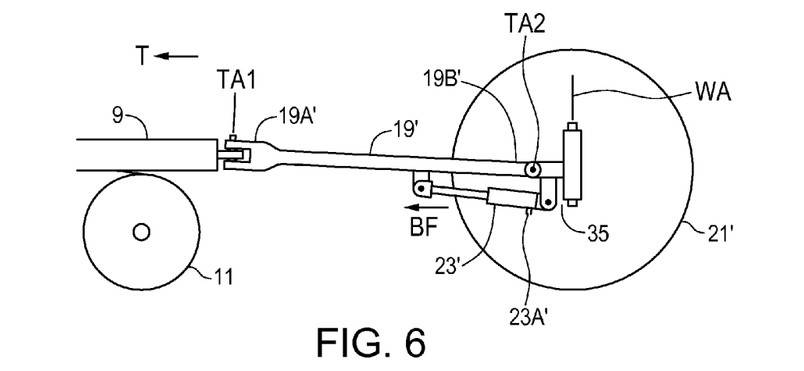
FIG. 6 is a schematic side view of the support arm and support wheel provided by the tongue and wheels of the cart of FIG. 5.

FIGS. 5 and 6 schematically illustrate the agricultural implement 3 comprising a cart 33 connected to a rear end of the implement frame by one of the support arms 19' such that the cart 33 is pulled in the operating travel direction T behind the implement frame 9, and wherein the corresponding support wheel 21' is provided by front wheels of the cart 33.

The cart 33 is a product cart that carries agricultural products such as seed and fertilizer and is connected to the implement frame 9 by a tongue 19' which can be used as a support arm. The tongue 19' is connected to the front wheels 21' of the cart 33 by a steering mechanism 35 configured such that moving the tongue 19' laterally pivots the front wheels 21' about substantially vertical wheel axes WA to steer the front wheels 21' to follow the implement frame 9 through turns. The tongue 19' has a first end 19A' pivotally connected to a rear side of the implement frame 9 about a substantially vertical first tongue axis TA1. The second end 19B' of the tongue 19' is pivotally connected to the steering mechanism 35 about a substantially horizontal second tongue axis TA2 oriented substantially horizontally and perpendicular to the operating travel direction T. The rear end of the support hydraulic cylinder 23' is mounted to the steering mechanism 35, and the front end of the support hydraulic cylinder 23' is connected to the hitch tongue 19' forward of the second tongue axis TA2.

Directing pressurized hydraulic fluid into the first end 23A' of the support hydraulic cylinder 23' and extends same and pivots the hitch tongue 19' upward about the second tongue axis TA2 and the first end 19A' of the hitch tongue 19' forces the implement frame 9 upward to transfer weight from the implement frame 9, and the frame wheels 11, to the front cart wheels 21' in the same manner as the other support arms and wheels 19, 21 described above.

Figure 7:
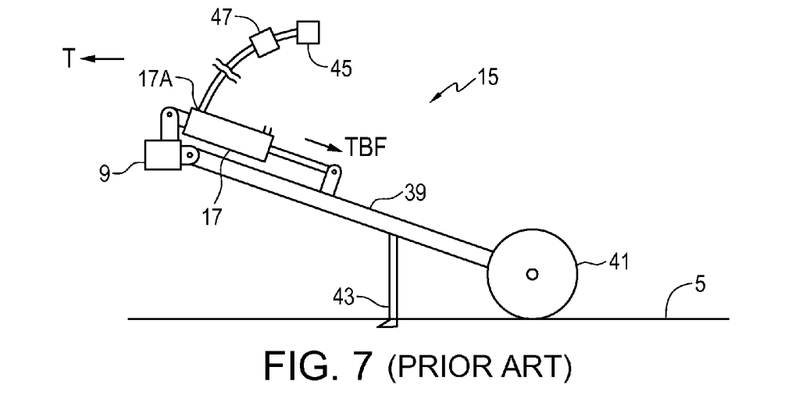
FIG. 7 is a schematic side view of a ground engaging tool provided by a trailing arm furrow opener assembly of the prior art.

In a common agricultural implement 3 for seeding crops, the ground engaging tools 15 comprise trailing arm furrow opener assemblies as are known in the prior art and as schematically illustrated in FIG. 7. Each trailing arm furrow opener assembly 15 comprises an opener arm 39 pivotally attached at a front end thereof to the implement frame 9, and a packer wheel 41 rotatably mounted to a rear end of the opener arm 39. A furrow opener 43 extends down from the opener arm 39 and a tool hydraulic cylinder 17 is operative to exert a downward tool bias force TBF on the opener arm 39 to push the furrow opener 43 down into engagement with the field surface 5.

The tool hydraulic cylinders 17 are connected to an active tool hydraulic source 45 with a pressure that is independent of the pressure of the active support hydraulic source 29, and a tool bias control 47 operative to vary the tool bias force TBF. The tool bias force TBF is increased or decreased depending on soil conditions, working depth, desired packing force, and like considerations. It can be seen that when the tool bias force TBF increases the upward tool force TF increases and weight is transferred from the implement frame 9 to the packer wheels 41, reducing the frame weight carried on the frame wheels 11 and support wheels 21. To maintain the proper load bearing relationship between the frame wheels 11 and support wheels 21, the support bias forces SBF are decreased when the tool bias forces TBF are increased, and similarly the support bias forces are increased when the tool bias forces are decreased.

Figure 8:
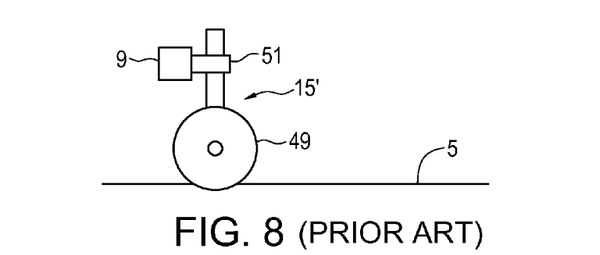
FIG. 8 is a schematic side view of ground engaging tool provided by a disc fertilizer banding assembly of the prior art.

In some cases first and second types of ground engaging tools that perform different operations may be mounted on the implement frame 9. FIG. 5 schematically illustrates first ground engaging tools being trailing arm furrow opener assemblies 15 as described above, mounted on middle and rear lateral bars of the implement frame 9, and second ground engaging tools being disc fertilizer banding assemblies 15' as schematically illustrated in FIG. 8 comprising a disc 49 mounted on the front lateral member of the implement frame 9 by a bracket 51 such that the disc 49 may be moved up and down and into or out of engagement with the field surface 5. When only the first ground engaging tools 15 are penetrating the field surface 5 a first support bias force SBF will be suitable, and when the second ground engaging tools 15' are lowered to penetrate the field surface 5 the upward tool force TF will change and the support bias force will need to be adjusted correspondingly to a different suitable support bias force.

The present disclosure provides a method of reducing implement wheel forces on an agricultural field surface 5.

The method comprises providing an agricultural implement 3 comprising an implement frame 9 mounted on a plurality of frame wheels 11 for travel in an operating travel direction T and a plurality of ground engaging tools 15 mounted on the implement frame 9, and wherein the frame wheels 11 support the implement frame 9 and ground engaging tools 15 in a desired orientation with respect to the field surface 5; movably connecting a plurality of support arms 19 to the implement frame 9 and rotatably mounting a support wheel 21 to a wheel end of each support arm 19; towing the agricultural implement 3 along the field surface with the ground engaging tools 15 penetrating the field surface 5 to a desired working depth D, wherein the ground engaging tools 15 exert an upward tool force TF on the implement frame 9 that is less than a downward force exerted by a frame weight of the implement frame 9; exerting a support bias force SBF on each support arm 19 to push the support wheel 21 against the field surface 5 and to correspondingly urge the implement frame 9 upward with respect to the support wheels 21 to transfer a supported frame weight SFW from the implement frame 9 to the support wheels 21, such that an unsupported frame weight UFW is carried on the frame wheels 11; and selecting the support bias forces SBF such that the unsupported frame weight UFW is greater than the upward tool force TF.

The present disclosure provides a system and method for reducing wheel forces exerted on agricultural field surfaces, thereby reducing compaction and loss of soil productivity. In the present disclosure the weight of the implement frame is spread over more wheels, thus reducing the weight on each wheel. In addition to reducing compaction, in very soft field surfaces the tendency of the frame wheels to sink into soft ground is reduced.

The support system may be mounted on all sides of the implement to support all sides, or may be mounted only on locations where more support is desirable. The arms and wheels of the system can be located at convenient locations where interference with functionality of the implement is minimized. Since the support wheels 21 do not dictate the orientation of the implement frame 9 and ground engaging tools 15, many of the problems associated with positioning larger wheels for increased support on an implement frame are avoided.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method of reducing implement wheel forces on an agricultural field surface, the method comprising:
   providing an agricultural implement comprising an implement frame mounted on a plurality of frame wheels for travel in an operating travel direction and a plurality of ground engaging tools mounted on the implement frame, and wherein the frame wheels support the implement frame and ground engaging tools in a desired orientation with respect to the field surface;
   movably connecting a plurality of support arms to the implement frame and rotatably mounting a support wheel to a wheel end of each support arm;
   towing the agricultural implement along the field surface with the ground engaging tools penetrating the field surface to a desired working depth, wherein the ground engaging tools exert an upward tool force on the implement frame that is less than a downward force exerted by a frame weight of the implement frame;
   exerting a support bias force on each support arm to force the support wheel against the field surface and to correspondingly force the implement frame upward with respect to the support wheel to transfer a supported frame weight from the implement frame to the support wheels, such that an unsupported frame weight is carried on the frame wheels;
   selecting the support bias forces such that the unsupported frame weight is greater than the upward tool force.

2. The method of claim 1 comprising selecting the support bias forces such that the portion of supported frame weight carried by each support wheel is about equal to the portion of unsupported frame weight carried by each frame wheel.

3. The method of claim 1 wherein the support wheels are larger than the frame wheels and comprising selecting the support bias forces such that the portion of supported frame weight carried by each support wheel is greater than the portion of unsupported frame weight carried by each frame wheel.

4. The method of claim 1 wherein the frame wheels and support wheels exert a downward wheel pressure on the field surface depending on a size of a corresponding frame wheel tire and support wheel tire, and comprising selecting the support bias forces such that the downward wheel pressure exerted by the frame wheels is about equal to the downward wheel pressure exerted by the support wheels.

5. The method of claim 1 comprising increasing the desired working depth such that the upward tool force increases, and decreasing the support bias forces.

6. The method of claim 1 comprising decreasing the desired working depth such that the upward tool force decreases, and increasing the support bias forces.

7. The method of claim 1 wherein the agricultural implement comprises a plurality of first and second ground engaging tools mounted on the implement frame, and comprising towing the agricultural implement along the field surface with only the first ground engaging tools penetrating the field surface to a first desired working depth while exerting a first support bias force, then lowering the second ground engaging tools to penetrate the field surface to a second desired working depth and changing the first support bias force to a second support bias force that is different than the first support bias force.

8. The method of claim 1 comprising exerting the support bias forces on each support arm with a support hydraulic cylinder mounted at one end to the implement frame and mounted at an opposite end thereof to the support arm, and comprising selecting the support bias forces by selecting a pressure of hydraulic fluid in a first end of the support hydraulic cylinder.

9. The method of claim 8 wherein the selected pressure of hydraulic fluid at each support hydraulic cylinder is substantially the same, and wherein a first support hydraulic cylinder has a first diameter and exerts a first support bias force on a first support arm, and a second support hydraulic cylinder has a second diameter greater than the first diameter and exerts a second support bias force on a second support arm that is greater than the first support bias force.

10. The method of claim 8 comprising moving each support arm to a transport position by directing pressurized hydraulic fluid into a second end of the support hydraulic cylinder to raise the support arm and mounted support wheel above the field surface.

11. The method of claim 10 wherein a first end of each support arm opposite the wheel end thereof is pivotally connected to the implement frame about a substantially horizontal arm pivot axis.

12. The method of claim 1 wherein front support arms extend forward from a front end of the implement frame and a front support wheel is pivotally mounted on the wheel end of each front support arm about a vertical caster axis.

13. The method of claim 1 wherein the agricultural implement further comprises a cart connected to a rear end of the implement frame by one of the support arms such that the cart is pulled in the operating travel direction behind the implement frame, and wherein the corresponding support wheel is provided by front wheels of the cart.

14. A system for reducing implement wheel forces on an agricultural field surface, the system comprising:
- an agricultural implement comprising an implement frame mounted on a plurality of frame wheels for travel in an operating travel direction and a plurality of ground engaging tools mounted on the implement frame, and wherein the frame wheels support the implement frame and ground engaging tools in a desired orientation with respect to the field surface;
- a tool control operative to move the ground engaging tools down to penetrate the field surface to a desired working depth, and wherein when penetrating the field surface, the ground engaging tools exert an upward tool force on the implement frame;
- a plurality of support arms movably connected to the implement frame and a support wheel rotatably mounted to a wheel end of each support arm;
- a support bias element operative to exert a support bias force on each support arm to force the corresponding support wheel against the field surface and to correspondingly force the implement frame upward with respect to the support wheel to transfer a supported frame weight from the implement frame to the support wheels, such that an unsupported frame weight is carried on the frame wheels;
- a bias control operative to vary the support bias forces; and
- wherein the support bias forces are selected to maintain the unsupported frame weight at a level greater than the upward tool force.

15. The system of claim 14 wherein the support bias forces are decreased when the upward tool force increases, and increased when the upward tool force decreases.

16. The system of claim 14 further comprising a force sensor operative to determine a portion of the unsupported frame weight being carried by one of the frame wheels, and a force indicator operative to indicate same to an operator.

17. The system of claim 14 wherein the support bias elements are provided by support hydraulic cylinders, each support hydraulic cylinder mounted at one end to the implement frame and mounted at an opposite end thereof to the corresponding support arm, wherein an active support hydraulic source is operative to direct pressurized hydraulic fluid into a first port of each support hydraulic cylinder and allow the hydraulic fluid to flow into and out of the first port to allow the support hydraulic cylinder to extend and retract while exerting the support bias force, and wherein the support bias control is operative to vary a pressure of the hydraulic fluid.

18. The system of claim 17 wherein the active support hydraulic source is operative to direct pressurized hydraulic fluid into a first port of each support hydraulic cylinder at substantially the same pressure, and wherein a first support hydraulic cylinder has a first diameter and exerts a first support bias force on a first support arm, and a second support hydraulic cylinder has a second diameter greater than the first diameter and exerts a second support bias force on a second support arm that is greater than the first support bias force.

19. The system of claim 18 comprising moving each support arm to a transport position by directing pressurized hydraulic fluid into a second port of the support hydraulic cylinder to raise the support arm and mounted support wheel above the field surface.

20. The system of claim 18 wherein a first end of each support arm opposite the wheel end thereof is pivotally connected to the implement frame about a substantially horizontal arm pivot axis.

21. The system of claim 18 wherein the agricultural implement comprises a cart connected to a rear end of the implement frame by one of the support arms such that the cart is pulled in the operating travel direction behind the implement frame, and wherein the corresponding support wheel is provided by front wheels of the cart.

22. The system of claim 18 wherein the ground engaging tools are trailing arm furrow opener assemblies, each trailing arm furrow opener assembly comprising:
- an opener arm pivotally attached at a front end thereof to the implement frame;
- a packer wheel rotatably mounted to a rear end of the opener arm;
- a furrow opener extending down from the opener arm; and
- a tool hydraulic cylinder operative to exert a downward tool bias force on the opener arm;

wherein the system comprises a tool bias control operative to vary the tool bias force, and wherein the support bias forces are decreased when the tool bias forces are increased, and the support bias forces are increased when the tool bias forces are decreased.

* * * * *